(12) United States Patent
Mezheritsky (10) Patent No.: US 9,506,790 B2
(45) Date of Patent: Nov. 29, 2016

(54) TRANSDUCER MINI-HORN ARRAY FOR ULTRASONIC FLOW METER

(71) Applicant: Daniel Measurement and Control, Inc., Houston, TX (US)

(72) Inventor: Alex Mezheritsky, Houston, TX (US)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 70 days.

(21) Appl. No.: 14/667,261

(22) Filed: Mar. 24, 2015

(65) Prior Publication Data

US 2016/0282160 A1   Sep. 29, 2016

(51) Int. Cl.
*G01F 1/66*   (2006.01)
*B06B 1/06*   (2006.01)

(52) U.S. Cl.
CPC .............. *G01F 1/667* (2013.01); *B06B 1/0607* (2013.01)

(58) Field of Classification Search
CPC ......... G01F 1/66; H04R 17/00; G01S 15/00; H02N 3/00
USPC .................... 73/861.27; 367/155, 90; 310/10
See application file for complete search history.

(56) References Cited

U.S. PATENT DOCUMENTS

| | | | | |
|---|---|---|---|---|
| 5,539,965 A * | 7/1996 | Safari | ........................ | B06B 1/06 29/25.35 |
| 5,808,967 A * | 9/1998 | Yu | .......................... | B06B 1/0629 367/138 |
| 5,836,192 A | 11/1998 | Getman et al. | | |
| 6,384,516 B1 * | 5/2002 | Fraser | ................... | B06B 1/0622 310/334 |
| 6,865,140 B2 * | 3/2005 | Thomenius | ........... | B06B 1/0292 367/155 |
| 7,052,464 B2 * | 5/2006 | Wodnicki | .............. | B06B 1/0292 29/25.35 |
| 7,353,056 B2 * | 4/2008 | Hazard | ................. | B06B 1/0292 600/407 |
| 8,009,513 B2 * | 8/2011 | LaWhite | ................. | G01P 5/241 367/87 |
| 8,351,295 B2 * | 1/2013 | LaWhite | ............... | G01S 15/885 367/87 |
| 2005/0066744 A1 | 3/2005 | Kupnik et al. | | |
| 2007/0046108 A1 * | 3/2007 | Pearson | ................. | G02B 26/06 310/10 |
| 2009/0235501 A1 | 9/2009 | Straub, Jr. et al. | | |
| 2012/0125121 A1 | 5/2012 | Gottlieb et al. | | |

FOREIGN PATENT DOCUMENTS

EP   1337998 B1   8/2008

OTHER PUBLICATIONS

International Patent Application No. PCT/US2016/021471 International Search Report and Written Opinion dated May 27, 2016 (16 pages).

\* cited by examiner

*Primary Examiner* — Jewel V Thompson
(74) *Attorney, Agent, or Firm* — Conley Rose, P.C.

(57) ABSTRACT

A monolithic matching structure for use in an ultrasonic transducer. The matching structure includes a mini-horn array. The mini-horn array includes a back plate, a plurality of horns, and a front plate. The plurality of horns extend from the back plate. Each of the horns includes a base and a neck. The base is adjacent the back plate. The neck extends from the base. Transverse area of the base is larger than transverse area of the neck. The front plate is adjacent the neck of each of the horns.

35 Claims, 11 Drawing Sheets

TRANSDUCER MINI-HORN ARRAY FOR ULTRASONIC FLOW METER

BACKGROUND

Fluids, such as natural gas, are transported from place-to-place via pipelines. It is desirable to know with accuracy the amount of fluid flowing in the pipeline, and particular accuracy is demanded when the fluid is changing hands, or "custody transfer." Even where custody transfer is not taking place, however, measurement accuracy is desirable, and in these situations flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from computed flow velocities and the known cross-sectional area of the flow meter. The ultrasonic flow meter includes transducers that generate and detect the acoustic signals.

SUMMARY

An ultrasonic transducer that includes a mini-horn array suitable for use in measuring fluid flow using an ultrasonic flow meter is disclosed herein. In one embodiment, an ultrasonic flow meter includes a central passage for flow of a fluid stream to be metered and a plurality of pairs of ultrasonic transducers. Each pair of transducers is configured to form a chordal path across the central passage between the transducers. Each of the transducers includes a piezoelectric crystal and a matching structure. The matching structure includes a mini-horn array that is acoustically coupled to the piezoelectric crystal on one side, and is configured to provide acoustic impedance matching between the piezoelectric crystal and the fluid stream. The mini-horn array includes a back plate, a plurality of horns, and a front plate. The back plate is adjacent to the piezoelectric crystal. The plurality of horns extend from the back plate away from the piezoelectric crystal. Each of the horns includes a base and a neck. The base is adjacent the back plate. The neck extends from the base. Transverse area of the base is larger than transverse area of the neck. The front plate is adjacent the neck of each of the horns.

In another embodiment, an ultrasonic transducer for use in an ultrasonic flow meter includes a cylindrical housing, a piezoelectric crystal, and a matching layer. The cylindrical housing is configured for installation in the ultrasonic flow meter. The piezoelectric crystal is disposed within the housing. The matching layer is coupled to the housing, and includes a mini-horn array. The mini-horn array is acoustically coupled to the piezoelectric crystal on one side, and is configured to provide acoustic impedance matching between the piezoelectric crystal and a fluid stream on a side of the mini-horn array opposite the first side. The mini-horn array includes a back plate, a plurality of horns, and a front plate. The back plate is adjacent to the piezoelectric crystal. The plurality of horns extend from the back plate away from the piezoelectric crystal. Each of the horns includes a base and a neck. The base is adjacent the back plate. The neck extends from the base. Transverse area of the base is larger than transverse area of the neck. The front plate is adjacent the neck of each of the horns.

In a further embodiment, a matching layer for use in an ultrasonic transducer includes a mini-horn array. The mini-horn array includes a back plate, a plurality of horns, and a front plate. The plurality of horns extend from the back plate. Each of the horns includes a base and a neck. The base is adjacent the back plate. The neck extends from the base. Transverse area of the base is larger than transverse area of the neck. The front plate is adjacent the neck of each of the horns.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following description is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Metering fluid flow in extreme temperature environments presents numerous challenges. In conventional ultrasonic flow meters, the transducers include a matching layer of low-density epoxy that provides a good acoustic match between the high density piezoelectric crystal of the transducer and the relatively low density fluid flowing through the meter. Unfortunately, the mismatch in coefficients of thermal expansion of the piezoelectric crystal and the low-density epoxy can cause the low-density epoxy to crack when exposed to temperature extremes, temperature cycling, and/or high pressures that are often present in the fluid measurement environment. Also, the epoxy has low chemical resistivity, particularly to the chemically aggressive components of natural gas. A cracked and/or delaminated epoxy matching layer degrades transducer performance to a degree that dictates replacement of the transducer, which in turn may require that fluid flow through the flow meter and associated pipe system be discontinued.

Embodiments of the ultrasonic transducer disclosed herein include a matching structure that is not subject to failure when exposed to harsh environmental conditions. The matching structure of the present disclosure includes a mini-horn array rather than low-density epoxy. The matching structure with mini-horn array is monolithic, made of the same chemically resistant material, for example titanium, so that the coefficient of thermal expansion mismatch to the piezoelectric crystal and/or the transducer housing is not an issue, or is not critical. The horns provide impedance matching between the piezoelectric crystal and the fluid flowing through the ultrasonic flow meter.

Figure 1:
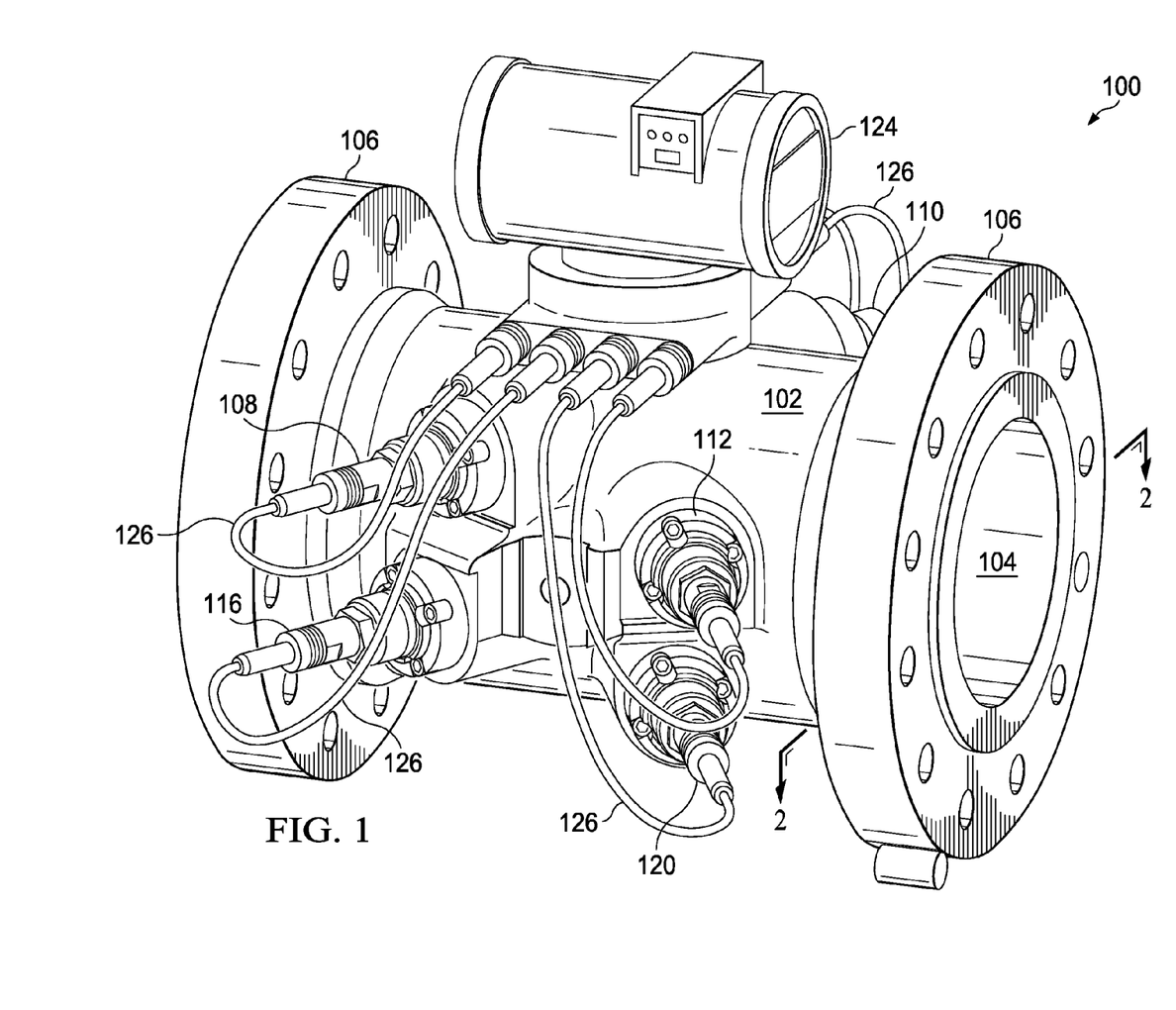
FIG. 1 shows an ultrasonic flow meter in accordance with principles disclosed herein.

FIG. 1 shows an ultrasonic flow meter 100 in accordance with principles disclosed herein. The ultrasonic flow meter 100 includes a meter body or spool piece 102 that defines a central passage or bore 104. The spool piece 102 is designed and constructed to be coupled to a pipeline or other structure (not shown) carrying fluids (e.g., natural gas) such that the fluids flowing in the pipeline travel through the central bore 104. While the fluids travel through the central bore 104, the ultrasonic flow meter 100 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 100 includes a plurality of transducer assemblies. In the view of FIG. 1 five such transducers assembles 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More specifically, each transducer assembly is electrically coupled to the control electronics package 124 by way of a respective cable 126 or equivalent signal conducting assembly.

Figure 2:
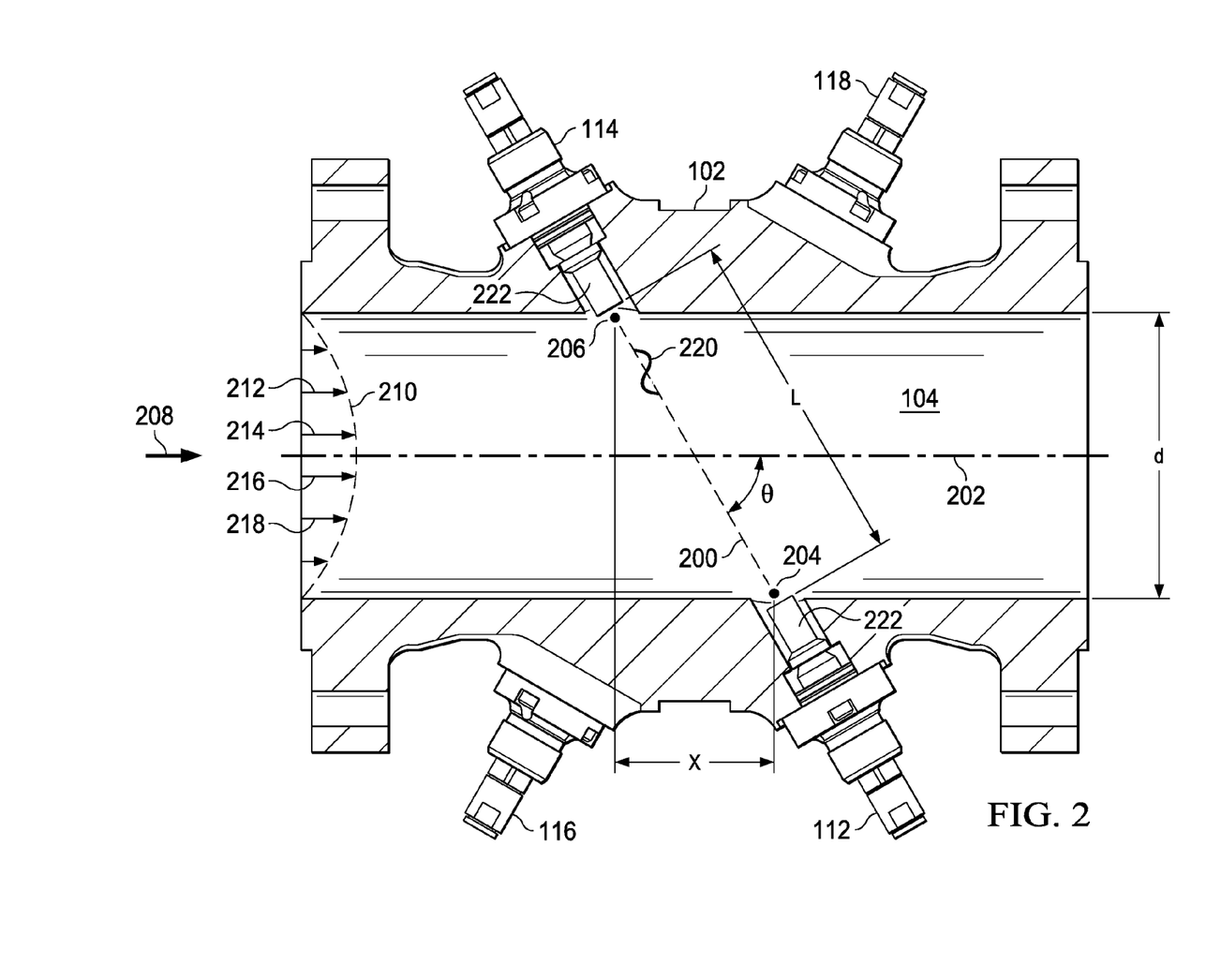
FIG. 2 shows a cross-sectional overhead view of an ultrasonic flow meter in accordance with principles disclosed herein.

FIG. 2 shows a cross-sectional overhead view of the ultrasonic flow meter 100 taken substantially along line 2-2 of FIG. 1. Spool piece 102 has a predetermined size and defines the central bore 104 through which the measured fluid flows. An illustrative pair of transducer assemblies 112 and 114 is located along the length of spool piece 102. Transducer assemblies 112 and 114 include acoustic transceivers, and more particularly include ultrasonic transducers 222 operating alternately as a transmitter and receiver. The ultrasonic transducers 222 both generate and receive acoustic signals having frequencies above about 20 kilohertz.

The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics associated with the flow meter 100 (e.g., the control electronics 124).

A path 200, also referred to as a "chord," exists between illustrative transducer assemblies 112 and 114 at an angle θ to a central bore centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102. The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Some time later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 100 carrying the fluid, the average velocity over the area of the central bore 104 may be used to find the volume of fluid flowing through the spool piece 102.

Figure 3:
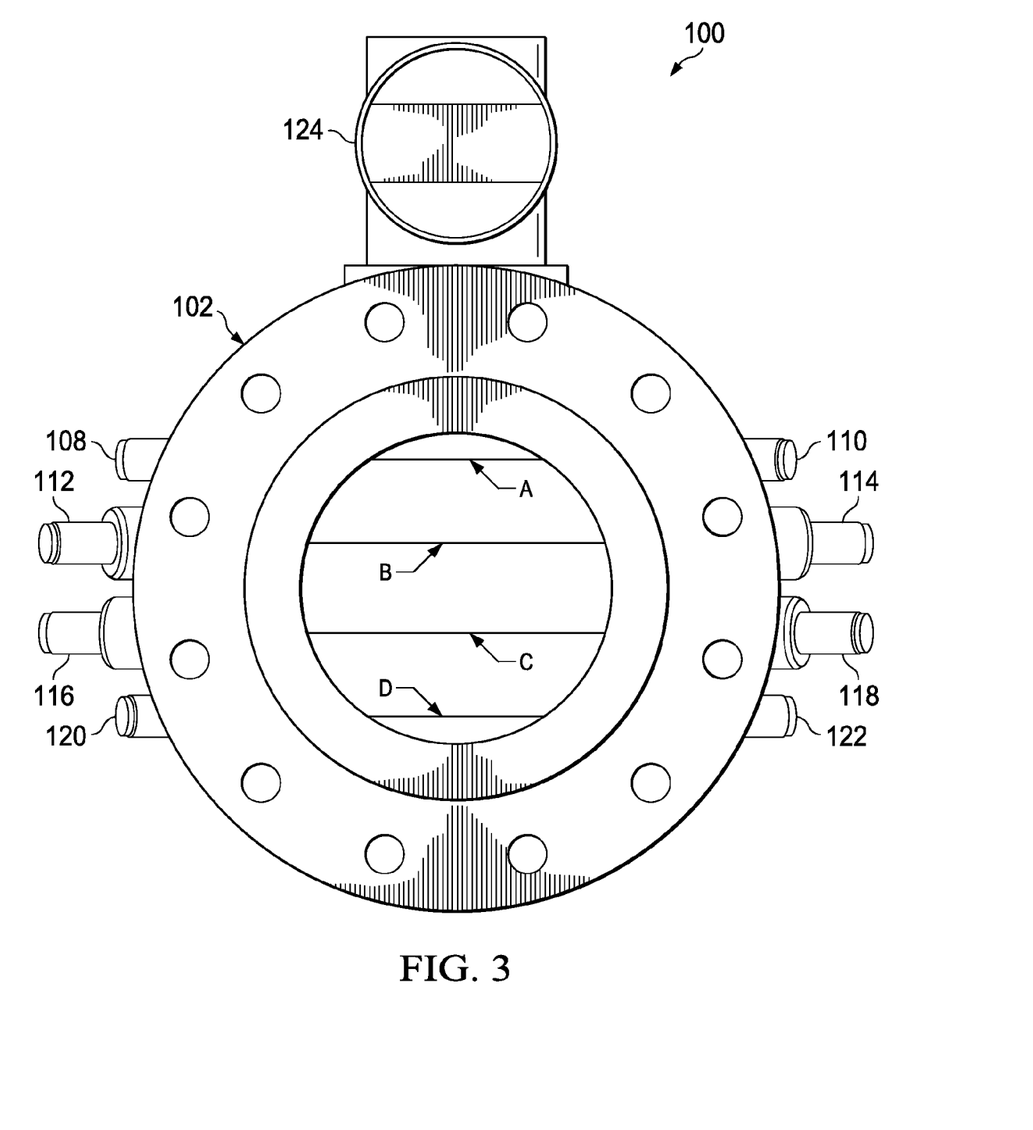
FIG. 3 shows an end elevation view of an ultrasonic flow meter in accordance with principles disclosed herein.

Ultrasonic flow meters can have one or more chords. FIG. 3 illustrates an end elevation view of ultrasonic flow meter 100. In particular, illustrative ultrasonic flow meter 100 comprises four chordal paths A, B, C and D at varying elevations within the spool piece 102. Each chordal path A-D corresponds to a transducer pair operating alternately as a transmitter and receiver. Transducer assemblies 108 and 110 (only partially visible) make up chordal path A. Transducer assemblies 112 and 114 (only partially visible) make up chordal path B. Transducer assemblies 116 and 118 (only partially visible) make up chordal path C. Finally, transducer assemblies 120 and 122 (only partially visible) make up chordal path D.

Figure 4:
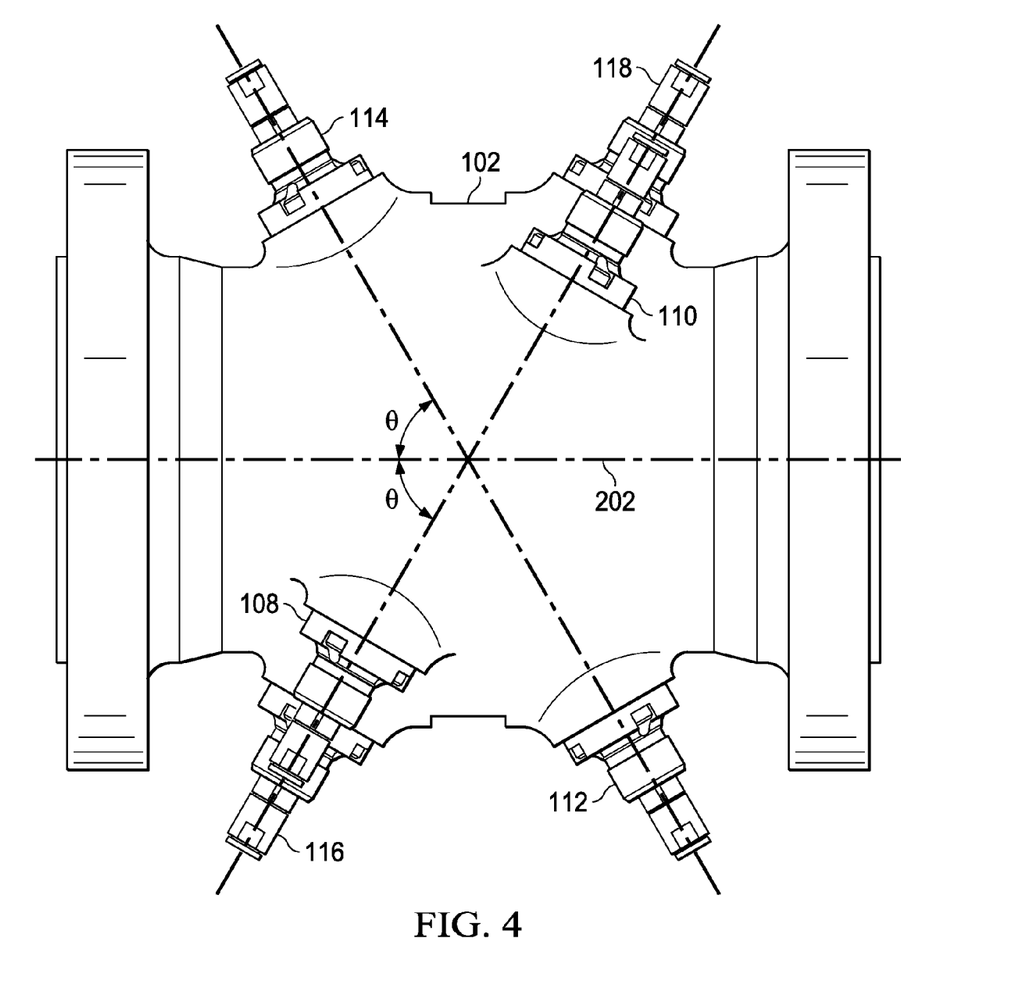
FIG. 4 shows an arrangement of transducer pairs of an ultrasonic flow meter in accordance with principles disclosed herein.

A further aspect of the arrangement of the four pairs of transducer assemblies is shown with respect to FIG. 4, which shows an overhead view. Each transducer assembly pair corresponds to a single chordal path of FIG. 3; however, the transducer assemblies are mounted at a non-perpendicular angle to the center line 202. For example, a first pair of transducer assemblies 108 and 110 is mounted at a non-perpendicular angle θ to centerline 202 of spool piece 102. Another pair of transducer assemblies 112 and 114 is mounted so that the chordal path loosely forms the shape of an "X" with respect to the chordal path of transducer assemblies 108 and 110. Similarly, transducer assemblies 116 and 118 are placed parallel to transducer assemblies 108 and 110, but at a different "level" or elevation. Not explicitly shown in FIG. 4 is the fourth pair of transducer assemblies (i.e., transducer assemblies 120 and 122). Considering FIGS. 2, 3 and 4, the transducer assembly pairs may be arranged such that the upper two pairs of transducer assemblies corresponding to chords A and B form an the shape of an "X", and the lower two pairs of transducer assemblies corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Typically, control electronics (e.g., control electronics package 124) cause the transducers 222 to fire, receive the output of the transducers, compute the mean flow velocity for each chord, compute the mean flow velocity for the meter, compute the volumetric flow rate through the meter, and perform meter diagnostics. The volumetric flow rate and possibly other measured and computed values, such as flow velocity and speed of sound, are then output to additional devices, such as a flow computer, that are external to the meter 100.

Figure 5:
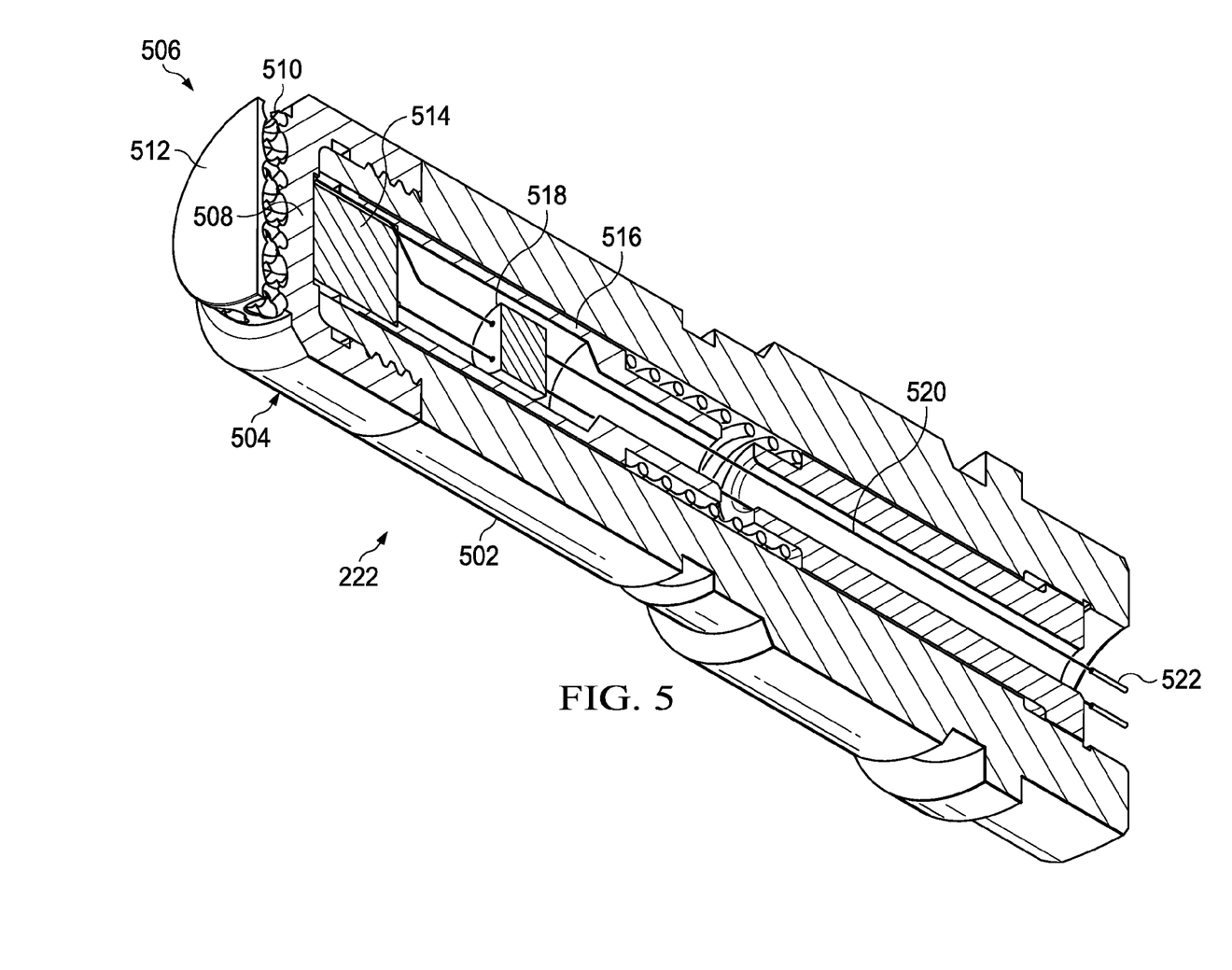
FIG. 5 shows an ultrasonic transducer including a mini-horn array in accordance with principles disclosed herein.

FIG. 5 shows a cross-sectional view of an ultrasonic transducer 222. Each transducer of the ultrasonic flow meter 100 (e.g., transducer 222 of transducer assembly 108, 110, 112, 114, 116, 118, 120, 122) may be structurally similar or identical to transducer 222 as shown in FIG. 5. The transducer 222 includes a housing 502, electrical/acoustical transducer 514, and a monolithic matching tip 504 with a mini-horn array 506 at one end. The housing 502 may be generally cylindrical, and composed of metal, such as titanium, INCONEL alloy or stainless steel. The electrical/acoustical transducer 514 and the matching tip 504 with mini-horn array 506 may be disposed at one end of the housing 502. The electrical/acoustical transducer 514 may be disposed in the interior of the housing 502 with a holder 516 mechanically supporting the electrical/acoustical transducer 514, and the mini-horn array 506 may be coupled to the exterior of the housing 502. Inside the holder 516 wires 520 connect the electrical/acoustical transducer 514 with the electrical matching and/or protecting elements 518, containing for example shunting resistor and/or damping diodes. Wires 520 connected to the connector pins 522 are connected to the cable 126.

Electrical conductors 520 connect the electrical/acoustical transducer 514 through the pins 522 and cable 126 to the control electronic package 124 (FIG. 1), which transmits electrical signals to and receives electrical signals from the electrical/acoustical transducer 514. The electrical/acoustical transducer 514 is an active element that emits and receives ultrasound energy. The electrical/acoustical transducer 514 may include a piezoelectric material such as lead zirconate titanate (PZT). A voltage applied across electrodes of the piezoelectric material induces an electric field within the piezoelectric material that causes the piezoelectric material to change shape and emit sound energy. Sound energy impinging on the piezoelectric material causes the piezoelectric material to change shape and develop a voltage between the electrodes.

The mini-horn array 506 serves as a monolithic matching layer for acoustic impedance matching between the high-impedance electrical/acoustical transducer 514 and low-impedance fluid flowing in the central bore 104. The monolithic matching tip 504 with mini-horn array 506 may be formed of plastic or metal. For example, the mini-horn array 506 may be formed of INCONEL alloy or titanium. The mini-horn array 506 includes a back plate 508, a plurality of horns 510, and a front plate 512. The diameter of the mini-horn array 506 may be, for example, approximately one inch. The back plate 508 may be, for example, approximately 0.15 inches thick. The front plate 512 may be, for example, approximately 0.03 inches thick. A first side of the back plate 508 is adjacent to the electrical/acoustical transducer 514 and a second side of the back plate 508 (opposite the first side) is adjacent the horns 510 to transfer acoustical energy between the horns 510 and the electrical/acoustical transducer 514. The front plate 512 is attached to the horns 510 opposite the back plate 508 and transfer acoustic energy from the horns 510 into the fluid flowing through the central bore 104, and from the fluid into the horns 510.

The mini-horn array 506 may include a large number of horns 510, for example 12-100 horns. The large number of horns 510 cumulatively provides a substantial acoustical effective working area. The mini-horn array 506 may be designed to operate with a working frequency in a range of 50-500 kilohertz, and acoustical impedance in a range 0.1-7 MRayls. Each of the horns 510 includes a base adjacent the back plate 508 and a neck extending from the base and adjacent to the front plate 512. The transverse cross sectional area of the neck is smaller than the transverse cross sectional area of the base.

Figure 6:
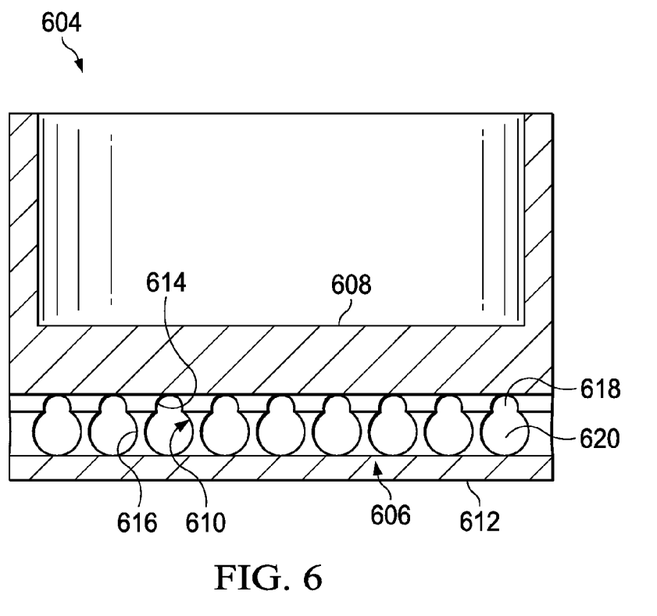
FIGS. 6-16 shows views of mini-horn arrays in accordance with principles disclosed herein.
Figure 7:
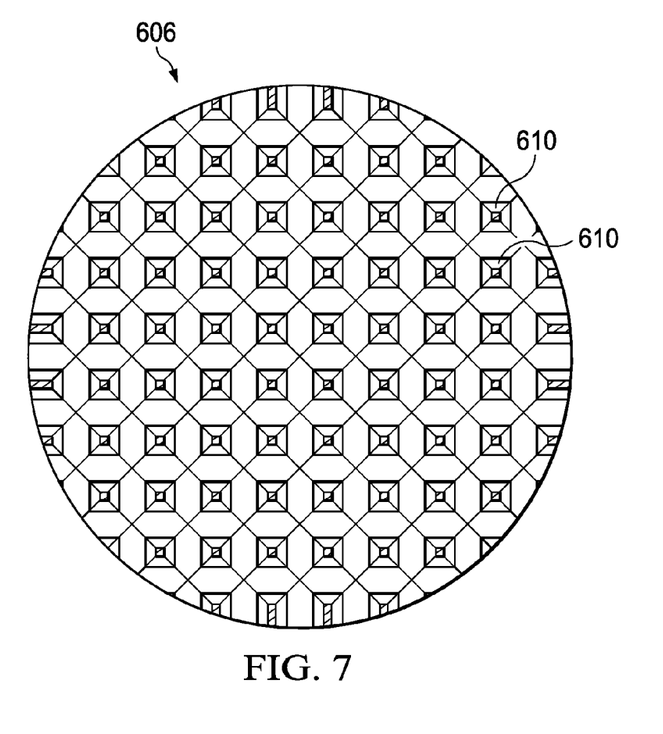

Embodiments of the mini-horn array 506 may include horns 510 having various shapes. FIG. 6 shows a side cross sectional view of one embodiment of a matching tip 604 with mini-horn array 606 having horns with a square transverse cross section as shown in FIG. 7. The mini-horn array 606 may serve as the mini-horn array 506. The mini-horn array 606 includes a back plate 608, horns 610, and front plate 612. Each of the horns 610 includes a neck 616 and a base 614. FIG. 7 shows a front cross sectional view of the mini-horn array 606. The horns 610 have a square transverse cross section. Some embodiments may have a rectangular transverse cross section. The area of each horn 610 proximate the base 614 may have an equal, or smaller, radius of curvature than the area proximate the neck 616. The bases 614 of the horns 610 may be formed by creating a first set of holes (or channels) of a first diameter r 618 through the monolithic body of the matching tip 605, preferably a cylindrical rod, and creating a second set of holes of the first diameter r 618 through the cylinder intersecting and perpendicular to the first set of holes. The necks 616 of the horns 610 may be formed by creating a third set of holes of a second diameter R 620, that is equal or larger R≥r than the first diameter r 618, through the cylinder and a fourth set of holes of the second diameter R 620 through the cylinder intersecting and perpendicular to the third set of holes. The centers of the second 620 larger diameter holes are shifted in respect to the centers of the first 618 smaller diameter holes in the longitudinal (axial) direction to the front plate in a range from R−r to R+r. The material between the holes forms the horns 610 with the base 614 and neck 616. The first, second, third, and fourth set of holes may be created by drilling or any other hole formation technique in a monolithic structure. The first and second diameters may be, for example, to provide an operational frequency near 125 kHz, approximately 0.05 inches and 0.10 inches respectively. The horn neck may be, for example, approximately 0.03 inches, and the spacing (periodicity) between adjacent horns 610 may be, for example, approximately 0.115 inches. The horns 610 may be approximately 0.125 inches in length. The operational frequency, and similarly the acoustical impedance, of the mini-horn array is basically directly proportional to the horn neck cross section area, and inversely proportional to the horn length and elementary horn cell transverse area (periodicity). The thickness of the front plate decreases the operation frequency and increases the acoustical impedance of the mini-horn array.

Figure 8:
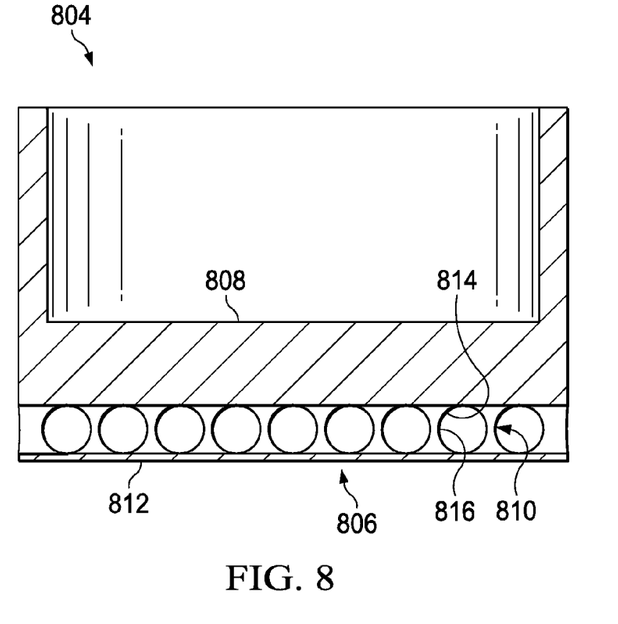
Figure 9:
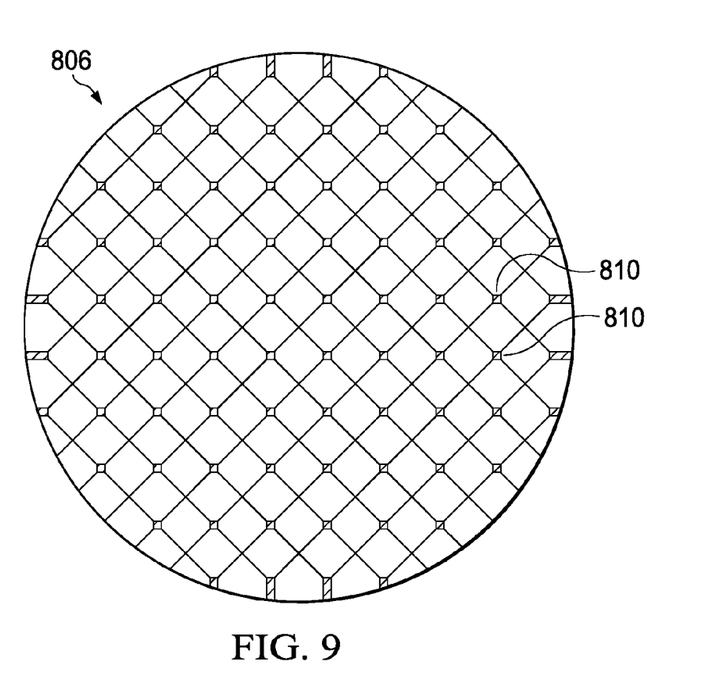

While the horns 610 have a step-like side profile, as shown in FIG. 6, other embodiments may have an exponential, conical or other profile. FIG. 8 shows a side cross sectional view of an embodiment of a mini-horn array 806 that has a semi-circular arc profile. The mini-horn array 806 may serve as the mini-horn array 506. The mini-horn array 806 includes a back plate 808, horns 810, and front plate 812. Each of the horns 810 includes a neck 816 and a base 814. FIG. 9 shows a front cross sectional view of the mini-horn array 806. The horns 810 have a square (or rectangular) transverse cross section. The bases 814 and necks 816 of the horns 810 may be formed by creating a first set of holes of a first diameter through a cylinder and a second set of holes of the first diameter through the cylinder intersecting and perpendicular to the first set of holes. The material between the holes forms the horns 810. The first and second set of holes may be created by drilling or any other hole formation technique. The first diameter may be, for example, approximately 0.10 inches. The spacing (periodicity) between adjacent horns 810 may be, for example, approximately 0.115 inches.

Figure 10:
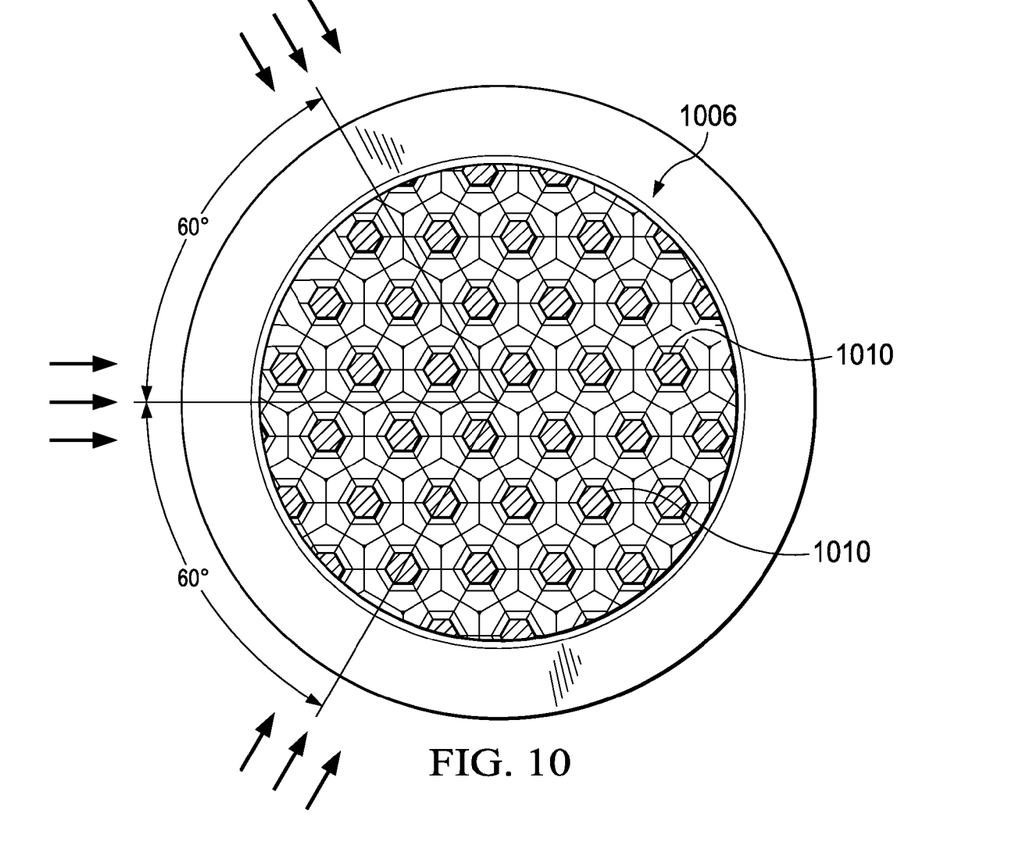

FIG. 10 shows a front cross sectional view of an embodiment of a mini-horn array 1006. The mini-horn array 1006 may serve as the mini-horn array 506. In some embodiments, the array 1006 may include holes of a single diameter as per array 806, while in other embodiments the array 1006 may include holes of two different diameters as per array 606. In the mini-horn array 1006, the horns 1010 have a hexagonal transverse cross section. The horns 1010 may be formed by creating a first set of holes of a first diameter through a cylinder, creating a second set of holes of the first diameter through the cylinder intersecting and at a 60° to the first set of holes, and creating a third set of holes of the first diameter through the cylinder intersecting and at a 120° angle to the first set of holes. The material between the holes forms the horns 1010. To make the hexagonal transverse cross section, the third set of holes crosses the structure at the intersections of the first and second sets of holes. In embodiments that include holes of two different diameters, as per array 606, the holes of second diameter are aligned with the holes of first diameter as illustrated in array 606 (FIG. 6). The holes may be created by drilling or any other hole formation technique.

Figure 11:
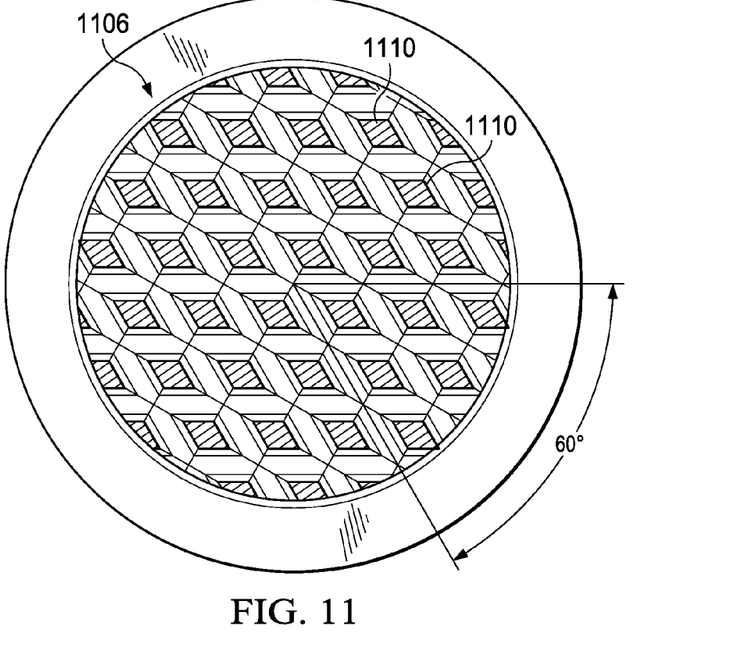

FIG. 11 shows a front cross sectional view of an embodiment of a mini-horn array 1106. The mini-horn array 1106 may serve as the mini-horn array 506. In some embodiments, the array 1106 may include holes of a single diameter as per array 806, while in other embodiments the array 1106 may include holes of two different diameters as per array 606. In the mini-horn array 1106, the horns 1110 have a rhomboid transverse cross section. The horns 1110 may be formed by creating a first set of holes of a first diameter through a cylinder, creating a second set of holes of the first diameter through the cylinder intersecting and at a 30° to less than 90° angle to the first set of holes. In some embodiments, the second set of holes may be formed at approximately a 60° angle to the first set of holes. The material between the holes forms the horns 1110. In embodiments that include holes of two different diameters, as per array 606, the holes of second diameter are aligned with the holes of first diameter as illustrated in array 606 (FIG. 6). The holes may be created by drilling or any other hole formation technique.

Figure 12:
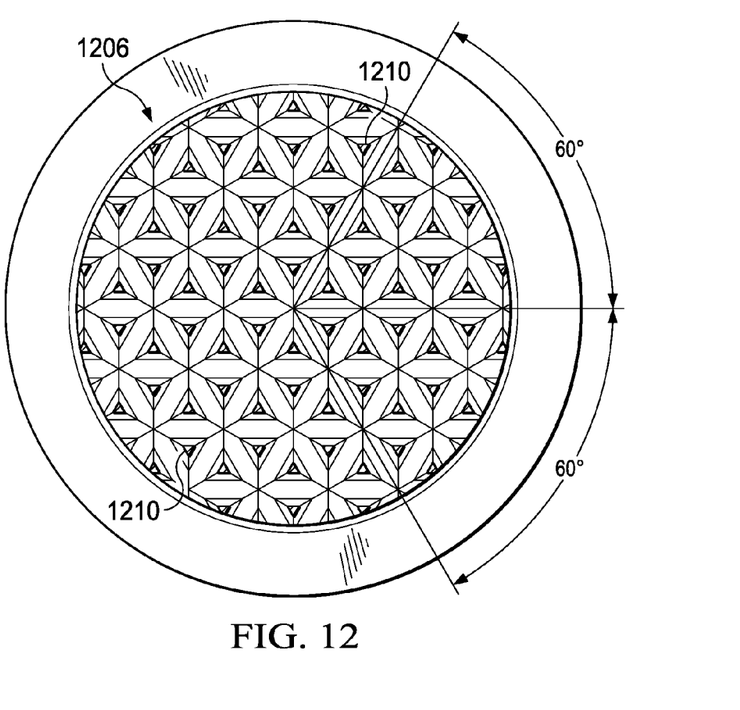

FIG. 12 shows a front cross sectional view of an embodiment of a mini-horn array 1206. The mini-horn array 1206 may serve as the mini-horn array 506. In some embodiments, the array 1206 may include holes of a single diameter as per array 806, while in other embodiments the array 1206 may include holes of two different diameters as per array 606. In the mini-horn array 1206, the horns 1210 have a triangular transverse cross section. The horns 1210 may be formed by creating a first set of parallel holes of a first diameter through a cylinder, creating a second set of parallel holes of the first diameter through the cylinder intersecting at a 60° to the first set of holes, and creating a third set of parallel holes of the first diameter through the cylinder intersecting and at a 120° to the first set of holes. The material between the holes forms the horns 1210. To make the triangular transverse cross section, all three sets of holes cross at the same points. In embodiments that include holes of two different diameters, as per array 606, the holes of second diameter are aligned with the holes of first diameter as illustrated in array 606 (FIG. 6). The holes may be created by drilling or any other hole formation technique. The spacing between parallel holes of the array 1206 may be less that that used to create a horn having a hexagonal cross section in the array 1006.

Figure 13:
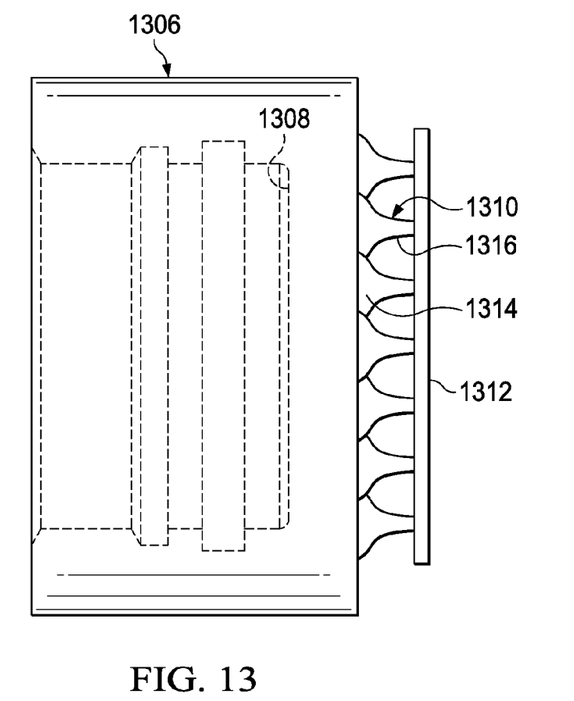
Figure 14:
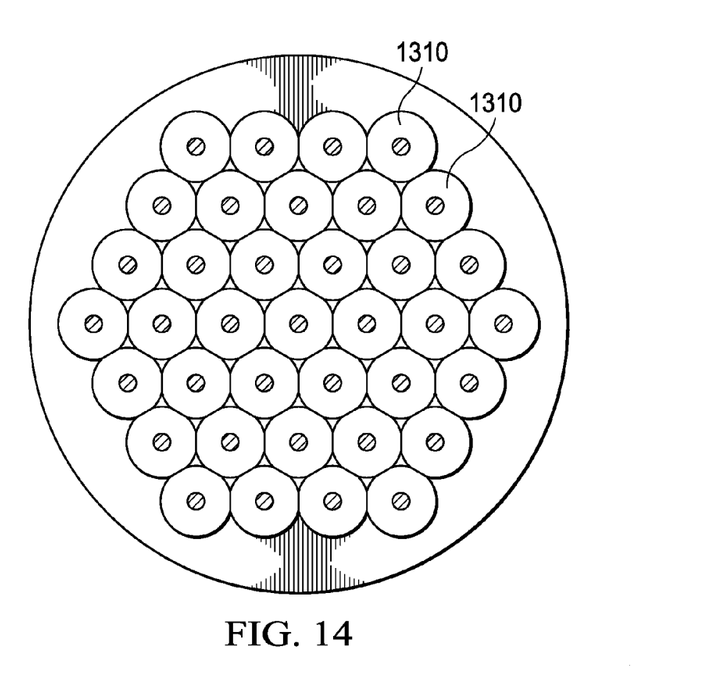
Figure 15:
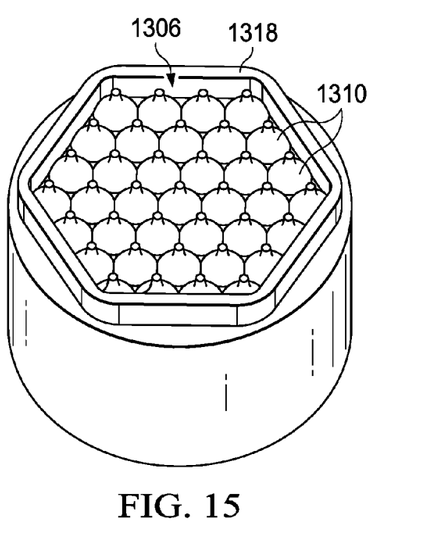
Figure 16:
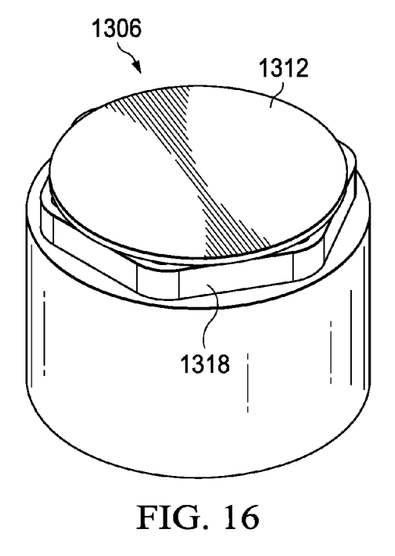

FIG. 13 shows a side view of an embodiment of a mini-horn array 1306. The mini-horn array 1306 may serve as the mini-horn array 506. The mini-horn array 1306 includes a back plate 1308, horns 1310, and front plate 1312. Each of the horns 1310 includes a neck 1316 and a base 1314. FIG. 14 shows a front view of the horns 1310. The horns 1310 have a circular (or elliptical) transverse cross section. The horns 1310, and other portions of the mini-horn array 1306, may be formed by three dimensional printing or any other suitable technique. The spacing (periodicity) between the horns 810 may be, for example, a constant of approximately 0.15 inches. The mini-horn array 1306 can also be an apodization structure to provide a predetermined array frequency spectra and transducer bandwidth, with the tangential distance between the adjacent horns, front plate thickness and/or the horn transverse neck cross-section area proportional to the distance from the center of the matching structure, directly or inversely. FIG. 15 shows an isometric view of the mini-horn array 1306 showing a protective ring 1318 formed about the horns 1310. The protective ring 1318 may include ports that allow fluid flow from outside the mini-horn array 1306 to the area about the horns 1310 for equalization of pressure outside and inside the mini-horn array 1306. Gaps between the protective ring 1318 and the front plate 1312 may serve as the ports. FIG. 16 shows an isometric view of the mini-horn array 1306 showing the protective ring 1318 and the front plate 1312.

Figure 17:
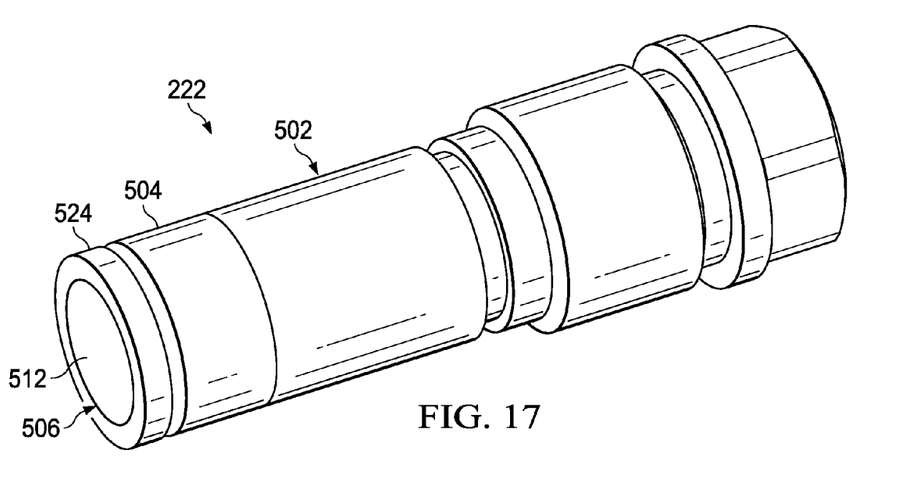
FIG. 17 shows a transducer that includes a protective ring around a mini-horn array in accordance with principles disclosed herein.

FIG. 17 shows a side view of the transducer 222 including a protective ring 524 circumferentially surrounding the horns of the mini-horn array 506. The protective ring 524 may be formed of the same material as the matching tip 504 with mini-horn array 506, or a material with a similar coefficient of expansion as the mini-horn array 506. The ring 524 protects the horns 510 and internal volume of the mini-horn array 506 from penetration of unwanted materials into the array 506, is intended to provide mono-frequency array resonance operation, and to provide higher acoustical signal strength based on the effect of pre-stress in the front plate 512.

The inside diameter of the ring 524 may be slightly smaller than the outside diameter of the mini horn array 506. The ring 524 may be mechanically attached to the mini-horn array 506 by expanding the ring via heating, while contracting the mini-horn array 506 via cooling. For example, the ring 524 may be heated to 100° Celsius and the mini-horn array cooled to −50° degrees Celsius for fitting of the ring 524 onto the mini-horn array 506. The heated ring 524 is fitted over the cooled mini-horn array 506, and when the assembly reaches thermal equilibrium the ring 524 is firmly attached to the mini-horn array 506. The ring 524 attached to the mini-horn array 506 as described above provides a robust mechanical ring-to-array connection under operational temperatures, and provides internal pressure compensation via ports formed by tiny gaps between the ring 524 and the mini-horn array 506.

The space about the horns 510 and inside the protective ring 524 may be filled with a high-viscosity, low compressibility material, such as wax, grease, gel, silicon damping material, or other high-viscosity liquid. The low-compressibility material may be disposed between the horns 510 before the protective ring 524 is attached to the mini-horn array 506. The low-compressibility material provides improved pressure compensation with working fluid pressure variation in the meter 100, with significantly less exchange of internal/external materials, based on reversible void shape in high-viscosity grease, as an example. Additionally, the low-compressibility material provides improved acoustical damping, with higher signal bandwidth and reduced ring-down.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow meter, comprising:
   a central passage for flow of a fluid stream to be metered;
   a plurality of pairs of ultrasonic transducers, each pair of transducers configured to form a chordal path across the passage between the transducers, each of the transducers comprising:
      a piezoelectric crystal; and
      a matching structure comprising a mini-horn array that is coupled to the piezoelectric crystal, the mini-horn array comprising:
         a back plate adjacent to the piezoelectric crystal;
         a plurality of horns extending from the back plate and away from the piezoelectric crystal, each of the horns comprising:
            a base adjacent the back plate; and
            a neck extending from the base, wherein transverse area of the base is larger than transverse area of the neck;
         a front plate adjacent the neck of each of the horns.

2. The ultrasonic flow meter of claim 1, wherein each of the horns has a square, rectangular, or rhomboid transverse cross section.

3. The ultrasonic flow meter of claim 1, wherein each of the horns has a triangular or hexagonal transverse cross section.

4. The ultrasonic flow meter of claim 1, wherein each of the horns has a circular or elliptical transverse cross section.

5. The ultrasonic flow meter of claim 1, wherein the mini-horn array comprises at least 12 horns.

6. The ultrasonic flow meter of claim 1, wherein the matching structure comprises a ring circumferentially disposed about the mini-horn array.

7. The ultrasonic flow meter of claim 1, wherein the matching structure comprises a low-compressibility material that fills space between the horns.

8. The ultrasonic flow meter of claim 1, wherein for each of the horns, a radius of curvature of the neck is equal or greater than a radius of curvature of the base.

9. An ultrasonic transducer for use in an ultrasonic flow meter, the transducer comprising:
   a cylindrical housing configured for installation in the ultrasonic flow meter;
   a piezoelectric crystal disposed within the housing; and
   a matching structure coupled to the housing, the matching structure comprising:
      a mini-horn array that is acoustically coupled to the piezoelectric crystal, the mini-horn array comprising:
         a back plate adjacent and acoustically coupled to the piezoelectric crystal;
         a plurality of horns extending from the back plate and away from the piezoelectric crystal, each of the horns comprising:
            a base adjacent the back plate; and
            a neck extending from the base, wherein transverse area of the base is larger than transverse area of the neck;
         a front plate adjacent the neck of each of the horns.

10. The ultrasonic transducer of claim 9, wherein each of the horns has a square, rectangular, or rhomboid transverse cross section.

11. The ultrasonic transducer of claim 9, wherein each of the horns has a triangular or hexagonal transverse cross section.

12. The ultrasonic transducer of claim 9, wherein each of the horns has a circular or elliptical transverse cross section.

13. The ultrasonic transducer of claim 9, wherein the mini-horn array comprises 12 to 100 horns.

14. The ultrasonic transducer of claim 9, wherein the matching structure comprises a ring circumferentially disposed about the mini-horn array.

15. The ultrasonic transducer of claim 9, wherein the matching structure comprises a low-compressibility material that fills space between the horns.

16. The ultrasonic transducer of claim 9, wherein for each of the horns, a radius of curvature of the neck is equal or greater than a radius of curvature of the base.

17. A matching structure for use in an ultrasonic transducer, comprising:
a mini-horn array comprising:
a back plate;
a plurality of horns extending from the back plate, each of the horns comprising:
a base adjacent the back plate; and
a neck extending from the base, wherein transverse area of the base is larger than transverse area of the neck;
a front plate adjacent the neck of each of the horns.

18. The matching structure of claim 17, wherein each of the horns has a square, rectangular, rhomboid, triangular, hexagonal, circular, or elliptical transverse cross section.

19. The matching structure of claim 17, wherein the mini-horn array comprises at least 12 horns.

20. The matching structure of claim 17, wherein the matching structure is formed of a monolithic piece of metal.

21. The matching structure of claim 17, wherein the matching structure is formed of a monolithic piece of titanium.

22. The matching structure of claim 17, wherein the matching structure comprises a ring circumferentially disposed about the mini-horn array.

23. The matching structure of claim 17, wherein the matching structure comprises a low-compressibility material that fills space between the horns.

24. The matching structure of claim 17, wherein for each of the horns, a radius of curvature of the neck is greater than a radius of curvature of the base.

25. A method of making a matching structure for use in an ultrasonic transducer of an ultrasonic flow meter, comprising:
forming a back plate;
forming a front plate; and
forming an array of at least 12 horns between the back plate and the front plate;
wherein the back plate, the front plate, and the array of horns are formed in a monolithic body.

26. The method of claim 25, further comprising:
forming a first set of parallel channels through the monolithic body;
forming a second set of parallel channels through the monolithic body, transverse to and coplanar with the first set of channels;
wherein the first and second sets of channels form the back plate, the front plate, and the array of horns.

27. The method of claim 26, wherein each channel of the first set is equidistant from channels of the first set that are adjacent to the channel; and each channel of the second set is equidistant from channels of the second set that adjacent to the channel.

28. The method of claim 26, further comprising:
forming a third set of parallel channels through the monolithic body, each channel of the third set intersecting a single one of the channels of the first set along an entire length of the channel;
forming a fourth set of parallel channels through the monolithic body, transverse to and coplanar with the third set of channels, each channel of the fourth set intersecting a single one of the channels of the second set along an entire length of the channel.

29. The method of claim 28, wherein each channel of the third set is equidistant from channels of the third set that are adjacent to the channel; and each channel of the fourth set is equidistant from channels of the fourth set that are adjacent to the channel.

30. The method of claim 26, wherein the channels of the first set intersect the channels of the second set at a right angle and the channels of the first and second sets are spaced to form a square transverse cross-section in each horn of the horn array.

31. The method of claim 26, wherein the channels of the first set intersect the channels of the second set at an angle of 30° to 90° to form a rhombic transverse cross-section in each horn of the horn array.

32. The method of claim 26, further comprising forming a third set of parallel channels through the monolithic body, transverse to and coplanar with the first set of channels and the second set of channels, wherein the channels of the second set are at a 60° angle to the channels of the first set, and the channels of the third set are at a 60° angle to the channels of the second set and at a 120° angle to the channels of the first set; and wherein the channels of the first, second, and third sets are spaced to form a triangular cross-section in each horn of the horn array.

33. A method of claim 26, further comprising forming a third set of parallel channels through the monolithic body, transverse to and coplanar with the first set of channels and the second set of channels, wherein the channels of the second set are at a 60° angle to the channels of the first set, and the channels of the third set are at a 60° angle to the channels of the second set and at a 120° angle to the channels of the first set; and wherein the channels of the first, second, and third sets are spaced to form a hexagonal cross-section in each horn of the horn array.

34. The method of claim 25, further comprising building up the front plate, the back plate, and the array of horns by three dimensional printing.

35. The method of claim 34, further comprising building up the horns such that the horns have a circular or elliptical transverse cross-section.

* * * * *